(12) United States Patent  
Gober

(10) Patent No.: US 8,247,693 B2  
(45) Date of Patent: Aug. 21, 2012

(54) MAGNETIC LIGHT SWITCH COVER PLATE

(76) Inventor: Thomas Gober, Iuka, MS (US)

( * ) Notice: Subject to any disclaimer, the term of this patent is extended or adjusted under 35 U.S.C. 154(b) by 464 days.

(21) Appl. No.: 12/340,708

(22) Filed: Dec. 20, 2008

(65) Prior Publication Data

US 2009/0159307 A1 Jun. 25, 2009

Related U.S. Application Data

(60) Provisional application No. 61/015,525, filed on Dec. 20, 2007.

(51) Int. Cl.
*H05K 5/03* (2006.01)

(52) U.S. Cl. ............. 174/66; 174/67; 220/241; 220/242

(58) Field of Classification Search .................... 174/66, 174/67, 135, 480, 481, 50, 53, 57, 58; 220/3.2, 220/3.3, 241, 242, 230; 248/206.5; 439/536, 439/892; 379/454; 335/285

See application file for complete search history.

(56) References Cited

U.S. PATENT DOCUMENTS

| | | | | |
|---|---|---|---|---|
| 3,598,900 A | * | 8/1971 | Drake | 174/66 |
| 4,339,045 A | * | 7/1982 | Bodin | 174/66 |
| 4,676,570 A | * | 6/1987 | Pincherri | 439/892 |
| 5,003,128 A | * | 3/1991 | Grondin | 174/67 |
| 5,829,622 A | * | 11/1998 | Neuman | 220/230 |
| 5,955,702 A | * | 9/1999 | Grossman et al. | 174/66 |
| 5,992,807 A | * | 11/1999 | Tarulli | 379/454 |
| 6,491,271 B1 | * | 12/2002 | Adams | 248/206.5 |
| 6,888,940 B1 | * | 5/2005 | Deppen | 379/454 |
| 7,067,737 B2 | * | 6/2006 | Mallen | 174/66 |
| 7,071,414 B2 | * | 7/2006 | Kim | 174/66 |
| 7,209,021 B2 | * | 4/2007 | Clement | 335/285 |
| 7,214,898 B1 | * | 5/2007 | Margareten | 174/66 |
| 7,582,828 B2 | * | 9/2009 | Ryan | 174/481 |

* cited by examiner

*Primary Examiner* — Angel R Estrada  
(74) *Attorney, Agent, or Firm* — Wayne Edward Ramage; Baker Donelson

(57) ABSTRACT

A light switch cover plate with small but powerful neodymium (NIB) magnets, or other forms or types of strong magnets, located on the back or just beneath the surface of the cover. The magnets may be located 1 to 2 inches below the openings for the light switch, although other locations are possible. A user may easily and conveniently place common items such as keys, pocketknives, sunglasses, and the like, on the cover plate merely by touching them to the lower portion in the vicinity of the magnets.

7 Claims, 2 Drawing Sheets

MAGNETIC LIGHT SWITCH COVER PLATE

This application claims priority to Provisional Patent Application No. 61/015,525, filed Dec. 20, 2007, entitled "Magnetic Light Switch Cover Plate," and is entitled to that filing date for priority. The complete disclosure, specification, drawings and attachments of Provisional Patent Application No. 61/015,525 are incorporated herein in their entirety by reference.

FIELD OF INVENTION

This invention relates to a light switch cover plate. More particularly, the invention relates to a light switch cover plate with magnets.

DESCRIPTION OF EXEMPLARY EMBODIMENTS

Figure 1:
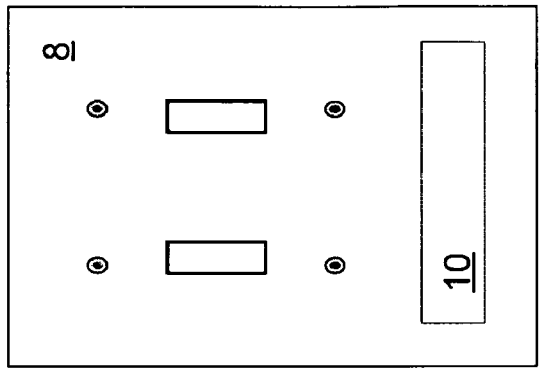
FIG. 1 shows a front view of two embodiments of the present invention.
Figure 1:
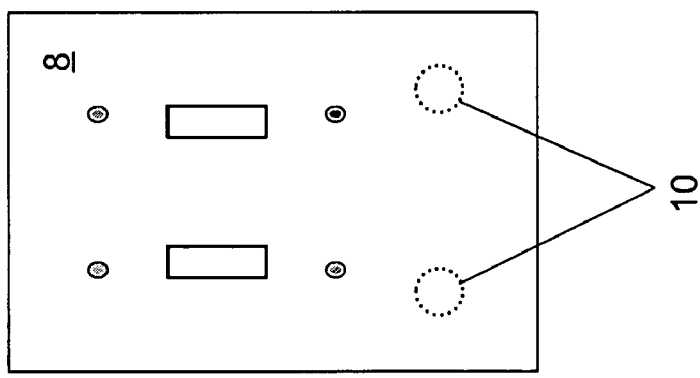
Figure 2:
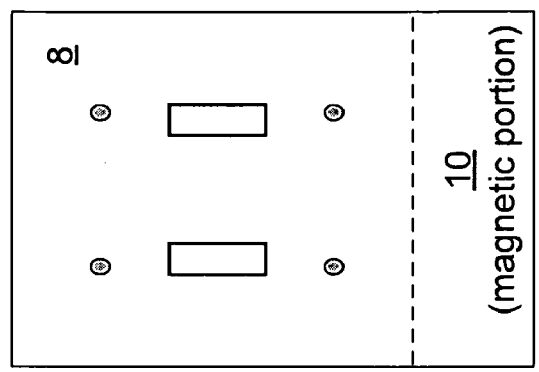
FIG. 2 shows alternative embodiments of the present invention.
Figure 2:
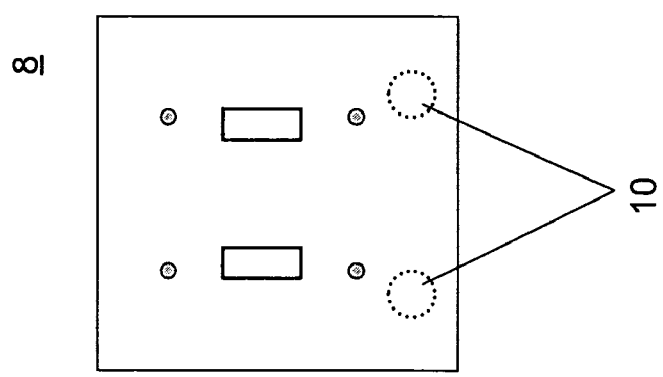

The present invention provides for a light switch cover plate with one or more small but powerful neodymium (NIB) magnets, or other forms or types of strong magnets, located on the back or just beneath the surface of the cover plate 8. As shown in FIG. 1, the magnet or magnets 10 may be located 1 to 2 inches below the openings for the light switch, although other locations are possible as seen in FIG. 2.

In this embodiment, the bottom of the light switch cover is extended 1.5 to 2 inches further down than a standard plate, with switch and screw holes all in standard positions as shown. The magnets may be located in this modified area, so the user may easily and conveniently place common items such as keys, pocketknives, sunglasses, and the like, on the cover plate merely by touching them to the lower portion in the vicinity of the magnets. In other embodiments, a standard size switch plate can be used.

The small, buried magnets are very useful for suspending objects without the need for hooks, Velcro, glue, or the like. If the objects to be suspended are metallic, they can be attached to the surface by simply placing them in contact with the surface in the vicinity of a magnet. If they are non-metallic, a small metallic or magnetic device, such as a clip, may be attached to the item, and the clip or similar metal device thereupon placed in contact with the surface in the vicinity of a magnet.

The placement of the NIB magnets in the base of the light switch cover is particularly efficient in several important ways: its provides a convenient way to affix the magnets to the wall; light switches are located in convenient locations next to entry and exit doors and the like; and people already are accustomed to reaching for switches upon entry or exit to or from their homes. This does so without affecting the appearance of the switch plate or the necessity of having hooks or similar protrusions extending from the switch plate.

The configuration and placement of switch holes and screw holes in the present invention conforms to the industry-wide standard for light switches and switch covers. The invention can be used for all configurations of light switches, including but not limited to 1-switch, 2-switch, 3-switch, 4-switch, switch and slide, and the like. The plates of the present invention can be made out of any material currently used to construct such plates, such as, but not limited to, plastic or wood.

In yet another embodiment, the light switch cover plate itself may be made of a magnetic material in whole or in part. For example, a metallic switch plate may have a portion magnetized, as seen in FIG. 2.

The magnets or magnetic portions can be of any size or shape, such as circles, ovals, spheres, squares, rectangles, strips, etc., whether affixed to the switch plate, embedded in the switch plate in whole or in part, or forming a part of the light switch cover plate itself. In various embodiments, the magnets may not be visible when the switch plate is installed, or may wholly or partially visible.

Thus, it should be understood that the embodiments and examples have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art. Accordingly, it is intended that the scope of the invention be defined by the claims appended hereto.

I claim:

1. A light switch plate assembly, comprising: a light switch plate with a front and a back and one or more light switch holes, and further with screw holes for receiving fastening screws to affix the light switch plate; and one or more magnets affixed to or embedded in the light switch plate in a position to support one or more metallic objects placed on the front of the light switch plate; wherein the one or more magnets are affixed to the back or non-exposed side of the light switch plate.

2. The light switch plate assembly of claim 1, wherein the one or more magnets are neodymium magnets.

3. The light switch plate assembly of claim 1, wherein the light switch plate is elongated in at least one direction, and the magnets are affixed to or embedded in the elongated portion of the light switch plate.

4. The light switch plate assembly of claim 1, wherein the metallic objects comprise one or more magnetic hooks.

5. The light switch plate assembly of claim 1, wherein the metallic objects comprise keys, pocketknives, or sunglasses.

6. The light switch plate assembly of claim 1, wherein the magnets are positioned below the light switch holes.

7. The light switch plate assembly of claim 1, wherein the magnets are positioned below the screw holes.

* * * * *